US011461822B2

(12) United States Patent
Wadhwa et al.

(10) Patent No.: US 11,461,822 B2
(45) Date of Patent: Oct. 4, 2022

(54) METHODS AND APPARATUS FOR AUTOMATICALLY PROVIDING PERSONALIZED ITEM REVIEWS

(71) Applicant: Walmart Apollo, LLC, Bentonville, AR (US)

(72) Inventors: Soumya Wadhwa, Sunnyvale, CA (US); Praveenkumar Kanumala, Newark, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 306 days.

(21) Appl. No.: 16/505,936

(22) Filed: Jul. 9, 2019

(65) Prior Publication Data

US 2021/0012406 A1   Jan. 14, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0255* (2013.01); *G06Q 30/0282* (2013.01)

(58) Field of Classification Search
CPC ........... G06Q 30/0631; G06Q 30/0255; G06Q 30/0282
USPC .................................................. 705/26, 27
See application file for complete search history.

(56) References Cited

U.S. PATENT DOCUMENTS

| | | | |
|---|---|---|---|
| 9,607,325 B1 | 3/2017 | Sriram | |
| 9,836,183 B1 | 12/2017 | Love et al. | |
| 2007/0271269 A1* | 11/2007 | Chen | G06F 16/24575 |
| 2008/0071602 A1 | 3/2008 | Ojakaar et al. | |
| 2009/0265307 A1* | 10/2009 | Reisman | G06F 16/954 |
| 2010/0169317 A1* | 7/2010 | Wang | G06F 40/284 |
| | | | 707/736 |

(Continued)

OTHER PUBLICATIONS

See et al.,"Get to the Point: Summarization with Pointer-Generator Networks," arXiv:1704.04368v2 [cs.CL] Apr. 25, 2017; Google 20pgs. (Year: 2017).*

(Continued)

*Primary Examiner* — Robert M Pond
(74) *Attorney, Agent, or Firm* — Duane Morris LLP; Manita Rawat

(57) ABSTRACT

This application relates to apparatus and methods for automatically determining and providing item reviews to users. In some examples, a computing device obtains review data identifying one or more reviews for each of a plurality of items. The computing device determines keywords for each of the items based on parsing the review data corresponding to each of items. The computing device may obtain data identifying engagement of items for a user during a browsing session, such as items a user has clicked on. The computing device may also obtain data identifying previous purchase transactions, or previous review postings, for the user. The computing device then determines, based on the obtained data, which keywords may be of interest the user. In some examples, the keywords are used to identify reviews of an item for the user. In some examples, summaries of the reviews are generated and displayed to the user.

19 Claims, 8 Drawing Sheets

(56) References Cited

U.S. PATENT DOCUMENTS

| | | | |
|---|---|---|---|
| 2011/0167066 A1 | 7/2011 | Picault et al. | |
| 2012/0089605 A1 | 4/2012 | Bangalore et al. | |
| 2015/0186790 A1* | 7/2015 | Ehlen | G06Q 10/00 706/52 |
| 2016/0275589 A1 | 9/2016 | Newsum | |
| 2018/0121555 A1* | 5/2018 | Li | G06F 16/9535 |
| 2018/0260860 A1 | 9/2018 | Devanathan et al. | |
| 2019/0026348 A1* | 1/2019 | Li | G06F 16/906 |
| 2019/0362020 A1* | 11/2019 | Paulus | G06N 3/04 |
| 2020/0110801 A1* | 4/2020 | Zheng | G06N 3/0445 |
| 2020/0134011 A1* | 4/2020 | Daultani | G06F 40/216 |
| 2020/0167604 A1* | 5/2020 | Shah | G06K 9/6262 |
| 2020/0250269 A1 | 8/2020 | Koseki et al. | |
| 2020/0311145 A1 | 10/2020 | Li et al. | |

OTHER PUBLICATIONS

Hu et al., "Mining and Summarizing Customer Reviews," KDD '04: Proceedings of the tenth ACM SIGKDD international conference on Knowledge discovery and data miningAug. 2004 pp. 168-177https://doi.org/10.1145/1014052.1014073 (Year: 2004).*

Language modeling by clustering with word embeddings for text readability assessment, Google Scholar arxiv.org Cha M Proceedings of the 2017 ACM on Conference on Information and Knowledge Management. Published 2017, 4pgs. (Year: 2017).*

Demand media introduces "trust" in online product reviews. (Jan. 19, 2011). Business Wire Retrieved from https://dialog.proquest.com/professional/docview/845548056?accountid=161862 (Year: 2011).

* cited by examiner

METHODS AND APPARATUS FOR AUTOMATICALLY PROVIDING PERSONALIZED ITEM REVIEWS

TECHNICAL FIELD

The disclosure relates generally to digital item reviews and, more specifically, to automatically determining and providing digital item review summaries.

BACKGROUND

At least some websites, such as retailer websites, display item reviews. For example, a website may allow a customer to purchase items. The website may display reviews of an item for sale that were posted by previous users of the item. While the website may allow for the selection of a satisfactory score (e.g., 1 to 5 stars), in at least some examples, the website allows a user to input text, such as statements or opinions about the item, and post the text as a review. Each user may provide a review about the item based on their own experiences with the item, for example. While some reviews may indicate a positive experience with an item, other reviews may indicate a negative experience with the item. In some examples, the same review may indicate both a positive and negative experience with the item. Some items may have many reviews.

When a customer is interested in an item, the customer may wish to read through one or more reviews to see what opinions others have had about the item. For example, a customer may wish to read the reviews to determine whether they should purchase the item. The customer, however, may not have enough time to read, or may not have any interest in reading, all of the reviews. In addition, in some examples, the customer may wish to read reviews that describe a particular feature of, or experience with, the item without having to read many or all reviews. In some examples, although a customer may read through many reviews, the customer may find it difficult to analyze and evaluate all of the information provided. As such, there are opportunities to address the presentation of reviews to customers.

SUMMARY

The embodiments described herein are directed to automatically determining and providing digital item review summaries that may be displayed, for example, on a website. The embodiments may allow a customer to be presented with reviews that interest the customer. For example, the embodiments may allow the customer to view reviews that describe a particular feature of, or experience with, the item. In some examples, the embodiments may provide summarizations of reviews, such as reviews describing a particular feature of, or experience with, the item that a customer is interested in. As a result, the embodiments may allow a retailer to present more relevant reviews to each customer. The customer may then more quickly evaluate reviews for an item, which may encourage the customer to purchase the item. In addition, because a customer may now spend less time reviewing an item, the customer may have additional time to consider additional items for purchase. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device is configured to obtain aspect data identifying a plurality of aspects for a user. The aspects may be keywords the user is associated with, for example. The computing device may also obtain a plurality of reviews for at least one item, such as online reviews posted by users on a website. The computing device may identify portions of the plurality of reviews, such as one or more sentences, based on the obtained aspect data. The computing device may cluster the identified portions of the plurality of reviews, and may generate cluster data identifying the clusters. The computing device may then generate review summary data identifying a review summary based on the generated cluster data. Each review summary may be a summary of a plurality of reviews, for example. In some examples, the computing device may generate the review summary data based on applying a pointer-generator network to the identified portions of the plurality of reviews. In some examples, the computing device receives a message from a second computing device, such as a web server, indicating the user is browsing the at least one item. In response, the computing device may transmit the review summary data to the second computing device.

In some embodiments, a method is provided that includes obtaining aspect data identifying a plurality of aspects for a user. The method also includes obtaining a plurality of reviews for at least one item, such as online reviews posted by users on a website. The method may include identifying portions of the plurality of reviews, such as one or more sentences, based on the obtained aspect data. The method may include clustering the identified portions of the plurality of reviews, and may also include generating cluster data identifying the clusters. The method may further include generating review summary data identifying a review summary based on the generated cluster data. In some examples, the method may include generating the review summary data based on applying a pointer-generator network to the identified portions of the plurality of reviews. In some examples, the method includes receiving a message from a second computing device, such as a web server, indicating the user is browsing the at least one item. The method may include transmitting the review summary data to the second computing device in response.

In yet other embodiments, a non-transitory computer readable medium has instructions stored thereon, where the instructions, when executed by at least one processor, cause a computing device to perform operations that include obtaining aspect data identifying a plurality of aspects for a user. The operations also include obtaining a plurality of reviews for at least one item, such as online reviews posted by users on a website. The operations may include identifying portions of the plurality of reviews, such as one or more sentences, based on the obtained aspect data. The operations may include clustering the identified portions of the plurality of reviews, and may also include generating cluster data identifying the clusters. The operations may further include generating review summary data identifying a review summary based on the generated cluster data. In some examples, the operations include generating the review summary data based on applying a pointer-generator network to the identified portions of the plurality of reviews. In some examples, the operations include receiving a message from a second computing device, such as a web server, indicating the user is browsing the at least one item. The operations may include transmitting the review summary data to the second computing device in response.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
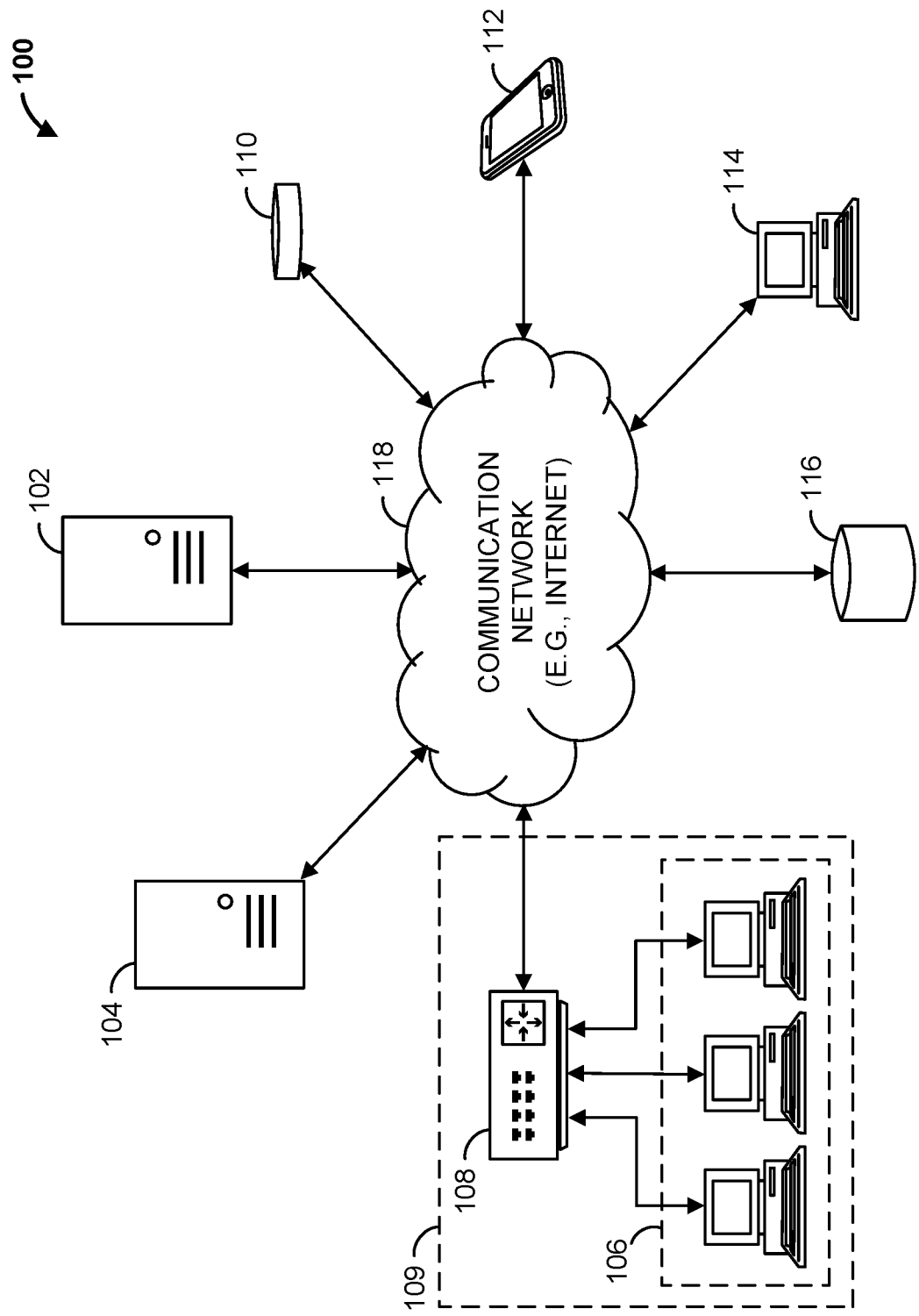
FIG. 1 is a block diagram of a digital review customization system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a digital review customization system 100 that includes a review customization computing device 102 (e.g., a server, such as an application server), a server 104 (e.g., a web server), workstation(s) 106, database 116, and multiple customer computing devices 110, 112, 114 operatively coupled over network 118. Review customization computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, review customization computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, review customization computing device 102 is operated by a retailer, and multiple customer computing devices 112, 114 are operated by customers of the retailer.

Although FIG. 1 illustrates three customer computing devices 110, 112, 114, digital review customization system 100 can include any number of customer computing devices 110, 112, 114. Similarly, digital review customization system 100 can include any number of workstation(s) 106, review customization computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with review customization computing device 102 over communication network 118. The workstation(s) 106 may send data to, and receive data from, review customization computing device 102. For example, the workstation(s) 106 may transmit data related to an order purchased by a customer at store 109 to review customization computing device 102. In response, review customization computing device 102 may transmit an indication of one or more item reviews to provide to the purchasing customer. For example, the item reviews may be displayed on a receipt handed to the customer for the purchase order.

In some examples, server 104 may be a web server and host one or more web pages, such as a retailer's website. Web server 104 may transmit data related to an order purchased on the website by a customer to review customization computing device 102. In response, review customization computing device 102 may transmit an indication of one or more item reviews to display on the website to the purchasing customer. For example, the item reviews may be displayed on a webpage dedicated to an item when the customer is browsing that webpage.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer that allows for the purchase of items. For example, the website may list prices for advertised items. An operator of one of multiple computing devices 110, 112, 114 may access the website hosted by web server 104, add one or more items to an online shopping cart of the website, and perform an online checkout of the shopping cart to purchase the items.

Review customization computing device 102 is operable to communicate with database 116 over communication network 118. For example, review customization computing device 102 can store data to, and read data from, database 116. Database 116 can be a remote storage device, such as a cloud-based server, a memory device on another application server, a networked computer, or any other suitable remote storage. Although shown remote to review customization computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Review customization computing device 102 may generate, for each customer, a ranking of aspects (e.g., keywords of interest in a review) that the customer may be interested in. The aspects may be used to determine which reviews, of a plurality of reviews, may be of interest to the customer. In some embodiments, the reviews are summarized and presented to the customer, thereby reducing the amount of review content a customer is presented with.

In some examples, to determine and represent item aspects, review customization computing device 102 may obtain review data identifying and characterizing reviews of an item, such as an item offered for purchase on a website hosted by web server 104. Review customization computing device 102 may apply one or more natural language processing algorithms to portions of the review data to parse the review data to identify one or more discrete linguistic elements (e.g., a word, a combination of morphemes, a single morpheme, etc.). Review customization computing device 102 may generate contextual information that establishes the meaning or a context of one or more of the discrete linguistic elements. For example, review customization computing device 102 may employ one or more syntactic rules, such as by applying a dependency parser, or a part-of-speech tagger, to identify (e.g., tag) words or phrases of the reviews, such as nominal subjects and corresponding sibling adjectives, as well as nouns with corresponding adjective modifiers. Review customization computing device 102 may then generate aspects (e.g., words, phrases) identifying these portions of the review data. Similarly, review customization computing device 102 may generate aspects for reviews of all items offered for purchase on a website hosted by web server 104, for example.

Review customization computing device 102 may then generate word embeddings for the generated aspects. For example, review customization computing device 102 may generate a word embedding for each word identified by an aspect. To generate the word embeddings, review customization computing device 102 may apply a model, such as a neural network model (e.g., Word2Vec, GloVe, ELMo), that is trained to reconstruct linguistic contexts of words.

Review customization computing device 102 may then cluster the word embeddings based on word meaning, e.g., such that words or phrases in a same cluster have similar meanings. For example, customization computing device 102 may employ one or more machine learning algorithms, such as a k-means algorithm (e.g., k-means clustering), a Gaussian Mixture Model, or a neural network to cluster the word embeddings based on similar meanings of the represented words. As a result, review customization computing device 102 may generate data identifying cluster representatives (e.g., words or phrases), where each cluster representative identifies a similar meaning of words for that cluster. For example, review customization computing device 102 may determine each cluster representative based on the number of times a word or phrase appears in the cluster (e.g., term frequency).

In some examples, review customization computing device 102 applies a weight to each cluster representative. The weights may be based on a term frequency, or based on inverse document frequency (tf-idf) scores (where reviews of a particular item can be considered a document), for each identified aspect, for example. In some examples, review customization computing device 102 generates, for each of a plurality of items (e.g., all items offered for purchase on a web site), weighted item aspects based on reviews corresponding to each of the plurality of items. In some examples, review customization computing device 102 may determine cluster representative weights based on the weighted aspects.

Review customization computing device 102 may also determine user interest inferences based on identifying aspects for a particular customer (e.g., user), where the aspects are determined based on activity for the particular customer. For example, customization computing device 102 may obtain user session data identifying a user's engagement with a website, such as a website hosted by web server 104, during one or more browsing sessions of the website. For example, web server 104 may store in database 116 items a user clicks on (e.g., item images clicked on by the user), items a user has added to an online shopping cart, or advertisements viewed or clicked on by the user.

Review customization computing device 102 may obtain the user session data, and identify aspects based on one or more reviews of items corresponding to the user session data. For example, review customization computing device 102 may identify an item that was clicked on by the user, and obtain reviews for that item. As another example, review customization computing device 102 may identify an item for which a user viewed an advertisement for, and obtain reviews for that item. Review customization computing device 102 may then identify aspects of these reviews, as described above.

In some examples, the user session data identifies keywords which a user engaged (e.g., clicked on, viewed, etc.) to filter reviews displayed to the user. For example, a website may display keywords that, if engaged, limits the displayed reviews to reviews that include or are associated with that keyword. Review customization device 102 may identify these keywords as aspects.

In some examples, customization computing device 102 obtains user transaction data identifying prior purchases of that customer. The user may have purchased items either in-store, such as at store 109, or online, such as on a website hosted by web server 104. Review customization device 102 may identify the items purchased based on the user transaction data, and may obtain reviews for that item. Review customization device 102 may then identify aspects of these reviews, as described above.

Similarly, customization computing device 102 may obtain user review data, which identifies reviews that the user has written and/or read. For example, web server 104 may store in database 116 user review data for a user identifying a post that was posted by the user for an item on a website. Based on the user review data, customization computing device 102 may identify aspects for the reviews posted by the user, as described above.

In some examples, review customization computing device 102 identifies aspects based on one or more attributes of an item. For example, review customization computing device 102 may identify an item based on user session data, user transaction data, or user review data. Review customization computing device 102 may then obtain a product description from a digital catalog for the item, and identify aspects based on the product description (or any other attribute of the item).

Review customization computing device 102 may then generate word embeddings, and cluster the word embeddings, for any of these identified aspects, as described above. For example, customization computing device 102 may employ one or more neural network models to generate the word embeddings, and to cluster the generated word embeddings based on similar meanings of their corresponding words. Review customization computing device 102 may also apply weights to each of the cluster representatives. In some examples, for each of a plurality of users, customization computing device 102 generates weighted user cluster representatives based on one or more of each user's user session data, user transaction data, or user review data. Review customization computing device 102 may store each user's weighted cluster representatives in database 116, for example.

Review customization computing device 102 may determine, for a particular user, recommended aspects, such as a personalized aspect ranking, based on item cluster representatives and user cluster representatives for that user. For example, review customization computing device 102 may determine aspect values based on a weight for each item cluster representative and a weight for each corresponding user cluster representative for a user (e.g., representatives of a same or similar cluster). The weights may be predefined and/or user configurable, for example. In some examples, review customization computing device 102 determines the aspect values by multiplying the corresponding weights. In some examples, review customization computing device 102 determines the aspect values based on the application of one or more machine learning algorithms, such as a neural network, to the weighted item cluster representatives and weighted user cluster representatives for the user. The machine learning algorithms may be trained, for example, on aspect engagement feedback. Review customization computing device 102 may determine the recommended aspects for the user based on the determined aspect values (e.g., items associated with higher aspect values may be ranked higher than items associated with lower aspect values).

Based on each user's personalized aspect ranking, customization computing device 102 may determine reviews to be displayed to that user when viewing an item. For example, web server 104 may transmit a message to review customization computing device 102 indicating that a particular user is viewing a particular item on a website. Based on a personalized aspect ranking for that user, review customization computing device 102 may determine a subset of all reviews for the item that should be displayed to that user. For example, reviews including aspects with higher probability scores may be displayed to the user before reviews with aspects with lower probability scores. In some examples, reviews including no ranked aspects may not be displayed, or displayed last. In some examples, web server 104 displays on a webpage keywords that allow the user to filter reviews for the item based on a selected keyword. For example, if a user selects a keyword, only reviews that include an aspect corresponding to the keyword with be displayed.

In some embodiments, review customization computing device 102 generates summaries of each review, such as of each review to be displayed to a particular user. For example, review customization computing device 102 may apply one or more natural language processing algorithms to the reviews to identify portions of each review, such as sentences, that include an aspect. For example, review customization computing device 102 may identify sentences in each review that include an aspect with a corresponding ranking above a minimum threshold. Review customization computing device 102 may then generate sentence embeddings for each identified sentence (or any portion of the review). To generate a sentence embedding, review customization computing device 102 may generate a word embedding for each word of the portion of the review. Review customization computing device 102 may then combine the word embeddings, such as by adding or averaging them, to generate a sentence embedding for that portion of the review. Sentence embeddings may also be generated using other methods such as doc2vec with the pre-trained word embeddings as input.

Review customization computing device 102 may cluster the sentence embeddings based on, for example, the application of a machine learning algorithm (e.g., unsupervised machine learning algorithm), such as a k-means algorithm or a Gaussian Mixture Model. For example, review customization computing device 102 may generate a sentence vector for each sentence, and use the generated vectors to find similar sentences. In some examples, review customization computing device 102 clusters the sentence embeddings based on the average of word vectors identifying values for word embeddings corresponding to each sentence. For example, sentences embeddings where average word vector values lie close to each other (e.g., within a predefined distance) in the embedding space are clustered together.

For each sentence cluster, review customization computing device 102 identifies (e.g., selects) a representative sentence for that sentence cluster. For example, review customization computing device 102 may identify a longest sentence of each sentence cluster. In some examples, review customization computing device 102 randomly selects a sentence for each sentence cluster. In some examples, review customization computing device 102 identifies the sentence closest to a mean sentence embedding value for all sentences in a given sentence cluster.

Review customization computing device 102 may then apply one or more text summarization models, such as a pointer-generator network, to the identified sentences to generate summaries. For example, review customization computing device 102 may generate personalized review summaries corresponding to a particular user based on application of a pointer-generator network to identified sentences based on the personalized aspects generated for an item for that particular user. In some examples, the review summaries are transmitted to web server 104 for display. In some examples, and in response to a selected keyword, review customization computing device 102 provides review summaries that include the selected keyword. For example, review customization computing device 102 may generate natural language review summaries for each aspect (e.g., keyword) that is clicked by the user on an item page of a web site hosted by web server 104.

Figure 2:
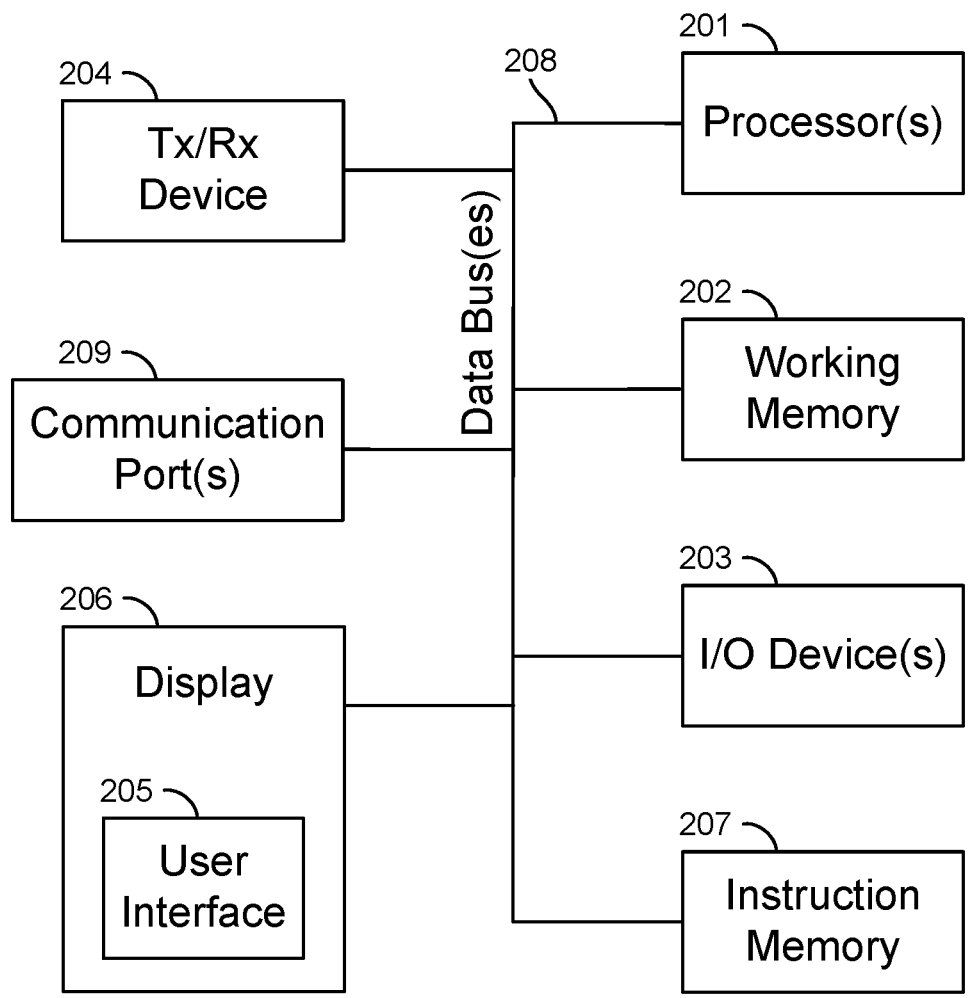
FIG. 2 is a block diagram of the review customization computing device of the digital review customization system of FIG. 1 in accordance with some embodiments.

FIG. 2 illustrates the review customization computing device 102 of FIG. 1. Review customization computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of review customization computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with review customization computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 review customization computing device 102 will be operating in. Processor(s) 201 is operable to receive data from, or send data to, a network, such as communication network 118 of FIG. 1, via transceiver 204.

Figure 3:
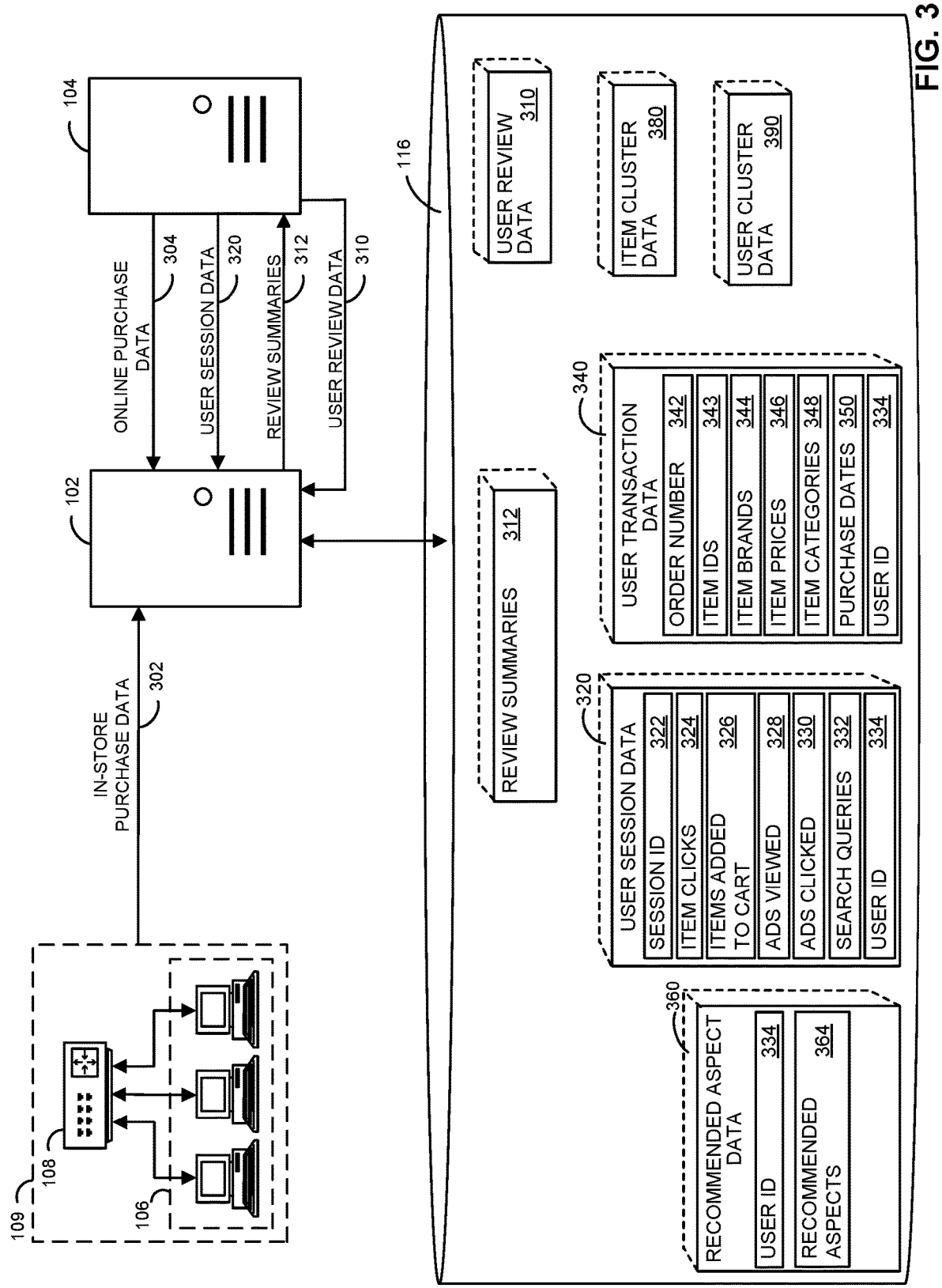
FIG. 3 is a block diagram illustrating examples of various portions of the digital review customization system of FIG. 1 in accordance with some embodiments.

FIG. 3 is a block diagram illustrating examples of various portions of the digital review customization system 100 of FIG. 1. As indicated in the figure, database 116 stores user session data 320, user transaction data 340, and user review data 310. Review customization computing device 102 may receive user session data 320 from web server 104 and may identify, for each user, data related to a browsing session, such as when browsing a retailer's webpage hosted by web server 104. In this example, user session data 320 may include a session ID 322, item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, search queries 332 identifying one or more searches conducted by the user during the browsing session, and user ID 334 ID (e.g., a customer ID, retailer website login ID, etc.).

Review customization computing device 102 may also receive in-store purchase data 302 identifying and characterizing one or more purchases from one or more stores 109. Similarly, review customization computing device 102 may receive online purchase data 304 from web server 104, which identifies and characterizes one or more online purchases, such as from a retailer's website. Review customization computing device 102 may parse in-store purchase data 302 and online purchase data 304 to generate user transaction data 340. In this example, user transaction data 340 may include an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and user ID 334 for the user making the corresponding purchase.

Review customization computing device 102 may also receive user review data 310 from web server 104. User review data 310 may identify, for each user, reviews the user has posted or engaged (e.g., viewed, clicked).

Based on one or more of user session data 320, user transaction data 340, and user review data 310, review customization computing device 102 may identify (e.g., extract) one or more aspects of a review of a corresponding item. In some examples, review customization computing device 102 may identify one or more aspects of a corresponding attribute, such as a product description, of the item.

Review customization computing device 102 may then generate word embeddings, and cluster the word embeddings, for any of these identified aspects. For example, customization computing device 102 may employ one or more neural network models to generate the word embeddings, and to cluster the generated word embeddings based on similar meanings of their corresponding words. Review customization computing device 102 may generate user cluster data 390 identifying and characterizing the clustered word embeddings, and may store user cluster data 390, for each user, in database 116. In some examples, review customization computing device 102 applies weights to each of the cluster representatives to generate weighted user cluster representatives.

Review customization computing device 102 may also generate item cluster data 380 identifying and characterizing clustered word embeddings of reviews for a plurality of items. For example, review customization computing device 102 may apply a dependency parser, or a part-of-speech tagger, to identify (e.g., tag) words or phrases of the reviews. Review customization device 102 may then generate aspects identifying portions of the reviews (e.g., words). Review customization computing device 102 may then generate word embeddings for the generated aspects by applying to the identified portions of the reviews a neural network model that is trained to reconstruct linguistic contexts of words, for example. Review customization computing device 102 may then cluster the word embeddings based on word meaning to generate item cluster data 380.

Based on item cluster data 380 and user cluster data 390, review customization computing device 102 may determine, for a particular user, recommended aspect data 360, which may identify a user ID 334, and recommended aspects 364 (which may be a personalized aspect ranking). For example, review customization computing device 102 may determine aspect values based on weights associated with the word embeddings identified by item cluster data 380 and user cluster data 390.

Figure 4A:
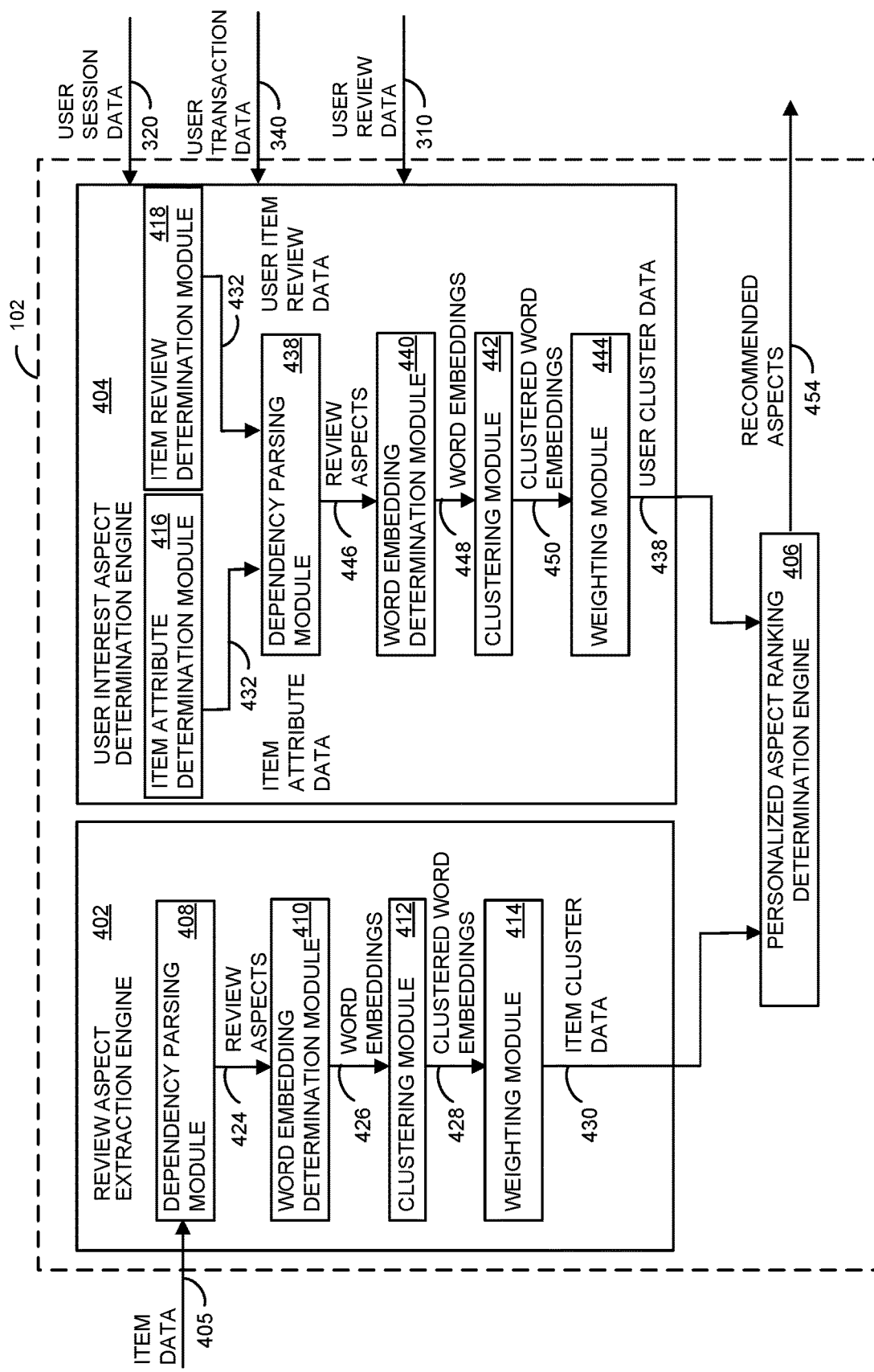
FIG. 4A is a block diagram illustrating examples of various portions of the review customization computing device of FIG. 1 in accordance with some embodiments.
Figure 4B:
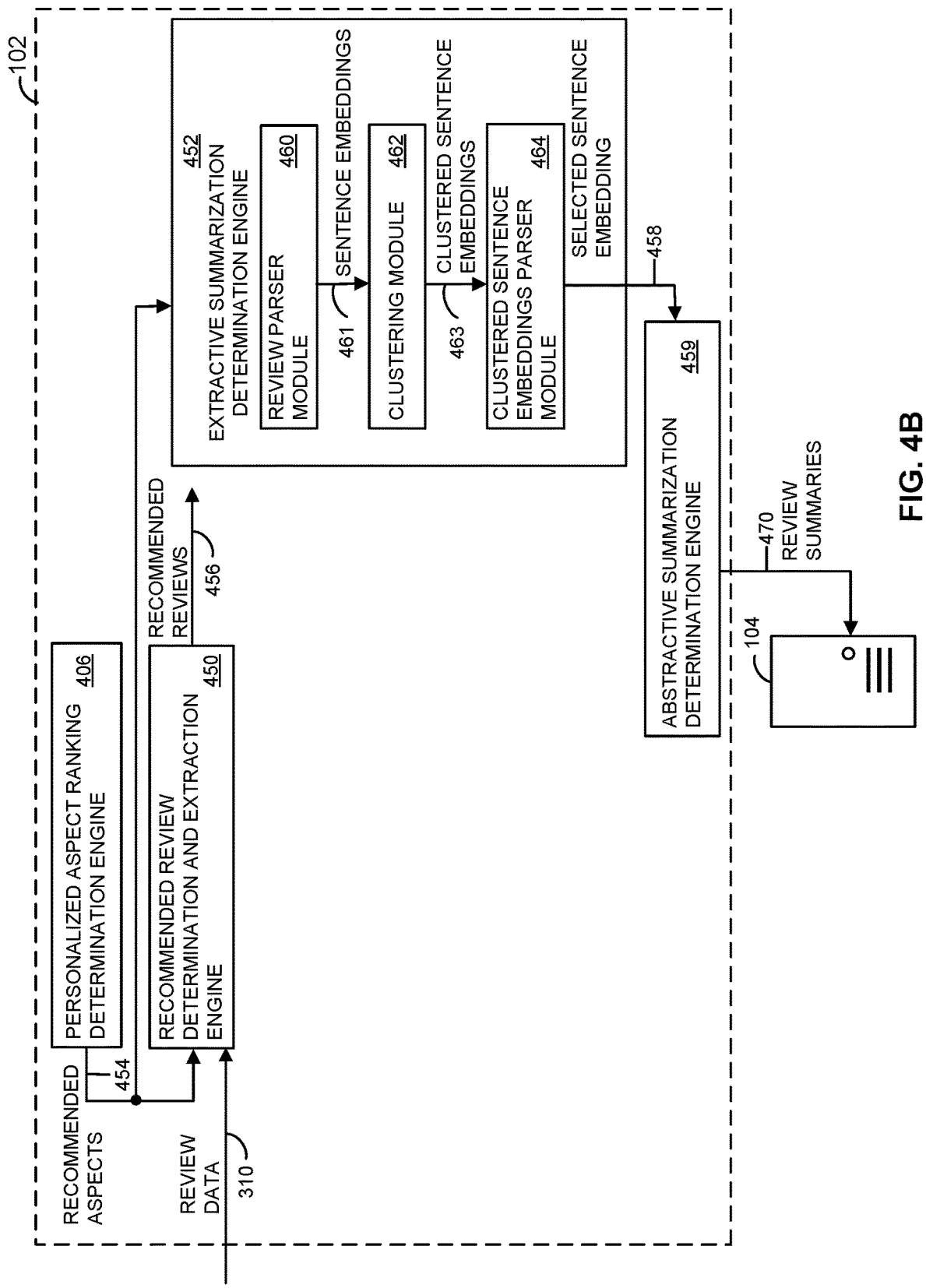
FIG. 4B is a block diagram illustrating examples of various portions of the review customization computing device of FIG. 1 in accordance with some embodiments.

FIGS. 4A and 4B illustrate examples of various portions of the review customization computing device 102 of FIG. 1. As indicated in FIG. 4A, review customization computing device 102 includes review aspect extraction engine 402, user interest aspect determination engine 404, and personalized aspect ranking determination engine 406. As illustrated in FIG. 4B, review customization computing device 102 also includes recommended review determination and extraction engine 450, extractive summarization determination engine 452, and abstractive summarization determination engine 459. In some examples, one or more of review aspect extraction engine 402, user interest aspect determination engine 404, personalized aspect ranking determination engine 406, recommended review determination and extraction engine 450, extractive summarization determination engine 452, and abstractive summarization determination engine 459 may be implemented in hardware. In some examples, one or more of review aspect extraction engine 402, user interest aspect determination engine 404, personalized aspect ranking determination engine 406, recommended review determination and extraction engine 450, extractive summarization determination engine 452, and abstractive summarization determination engine 459 may be implemented as an executable program maintained in a tangible, non-transitory memory, such as instruction memory 207 of FIG. 2, that may be executed by one or processors, such as processor 201 of FIG. 2.

Referring to FIG. 4A, review aspect extraction engine 402 includes a dependency parsing module 408, a word embedding determination module 410, a clustering module 412, and a weighting module 414. Dependency parsing module 408 receives item review data 405, which identifies item reviews of a plurality of items, and identifies (e.g., parses and tags) portions of the item reviews as aspects. Dependency parsing module 408 may include, for example, a dependency parser, or a part-of-speech tagger, to identify (e.g., tag) the words or phrases of the reviews. Dependency parsing module 408 generates review aspects 424 identifying and characterizing the identified aspects.

Word embedding determination module 410 generates word embeddings 426 based on the review aspects 424 received from dependency parsing module 408. For example, word embedding determination module 410 may include a neural network model that is trained to reconstruct linguistic contexts of words. Word embedding determination module 410 provides the word embeddings 426 to clustering module 412, which clusters the word embeddings 426 based on the meaning of their corresponding words. For example, clustering module 412 may employ a machine learning method such as a neural network that clusters word embeddings 426 with similar meanings together. Clustering module 412 generates clustered word embeddings 428 identifying word embeddings of various clusters, and provides clustered word embeddings 428 to weighting module 414. In some examples, weighting module 414 applies a weight to one or more of the word embeddings, for each cluster, identified by clustered word embeddings 428. Weighting module 414 provides item cluster data 430, identifying and characterizing the clusters, to personalized aspect ranking determination engine 406.

User interest aspect determination engine 404 includes item attribute determination module 416 and item review determination module 418, each of which receives user session data 320, user transmission data 340, and user review data 310. Item attribute determination module 416 determines one or more items corresponding user session data 320, user transmission data 340, and user review data 310, and identifies one or more attributes for each determined item. For example, item attribute determination module 416 may determine a product description for each item which, in some examples, is stored in database 116 as part of a digital catalog identifying attributes of a plurality of items. Item attribute determination module 416 generates item attribute data 432 identifying and characterizing the determined attributes, and provides item attribute data 432 to dependency parsing module 438.

Item review determination module 418 determines one or more items corresponding user session data 320, user transmission data 340, and user review data 310, and identifies one or more reviews of those items. For example, item review determination module 418 may obtain from database 116, for each identified item, one or more reviews posted by one or more users. Item review determination module 418 generates user item review data 434 identifying and characterizing the reviews for the identified items, and provides user item review data 434 to dependency parsing module 438.

Dependency parsing module 438 receives item attribute data 432 and user item review data 434, and identifies (e.g., parses and tags) portions of the corresponding item attributes and item reviews, respectively, as aspects. Dependency parsing module 438 may include functionality similar to that of dependency parsing module 408, for example. Dependency parsing module 438 generates review aspects 446 and provides review aspects 446 to word embedding determination module 440.

Word embedding determination module 440 generates word embeddings 448 based on review aspects 446, and provides the word embeddings 448 to clustering module 442. Clustering module 442 clusters word embeddings 448 based on the meaning of their corresponding words, and generates clustered word embeddings 450 identifying word embeddings for the various clusters. Clustering module 442 may include functionality similar to that of clustering module 412, for example. In some examples, clustering module 442 provides the clustered word embeddings 450 to weighting module 444. Weighting module 444 may apply a weight to one or more of the word embeddings, for each cluster, identified by clustered word embeddings 448. Weighting module 444 provides user cluster data 438, identifying and characterizing the clusters, to personalized aspect ranking determination engine 406.

Personalized aspect ranking determination engine 406 generates recommended aspects 454 based on item cluster data 430 and user cluster data 438. For example, personalized aspect ranking determination engine 406 may determine recommended aspects 454 based on weighted word embeddings identified by item cluster data 430, and weighted word embeddings identified by user cluster data 438. In some examples, recommended aspects 454 identify a ranking of recommended aspects. Review customization computing device 102 may provide recommended aspects 454 to web server 104, for example, which may use recommended aspects 454 to determine what reviews to display when a user is viewing an item.

In some embodiments, and referring to FIG. 4B, personalized aspect ranking determination engine 406 may provide recommended aspects 454 to recommended review determination and extraction engine 450. Based on recommended aspects 454, recommended review determination and extraction engine 450 may determine one or more reviews for an item. For example, recommended review determination and extraction engine 450 may obtain item review data 405 for an item, such as an item being viewed by a user on a website hosted by web server 104. Recommended review determination and extraction engine 450 may generate recommended reviews 456 identifying and characterizing reviews that include aspects identified by recommended aspects 454, and provide recommended reviews 456 to extractive summarization determination engine 452.

Extractive summarization determination engine 452 includes review parser module 460, clustering module 462, and clustered sentence embeddings parser module 464. Review parser module 460 may identify portions (e.g., sentences) of recommended reviews 456 that include recommended aspects 454, and generates sentence embeddings 461 that identify and characterize those portions. Clustering module 462 receives the sentence embeddings 461, and clusters them based on the application of a machine learning algorithm, such as a k-means algorithm. Clustering module 462 generates clustered sentence embeddings 463 identifying and characterizing the clusters, and provides clustered sentence embeddings 463 to clustered sentence embeddings parser module 464.

Clustered sentence embeddings parser module 464 obtains clustered sentence embeddings 463 and, for each cluster, identifies (e.g., selects) a representative sentence embedding for each sentence cluster. For example, clustered sentence embeddings parser module 464 may identify the sentence embedding associated with a longest sentence of each sentence embedding cluster. Clustered sentence embeddings parser module 464 generates selected sentence embeddings 458 identifying and characterizing each representative sentence embedding for each sentence cluster, and provides selected sentence embeddings 458 to abstractive summarization determination engine 459.

Abstractive summarization determination engine 459 generates review summaries 470 based on the application of a pointer-generator network to selected sentence embeddings 458. For example, review customization computing device 102 may apply a pointer-generator network to the representative sentence embeddings identified from each cluster identified by selected sentence embeddings 458 to generate review summary 470. Review summaries 470 may be provided to web server 104 for display. Web server 104 may display review summaries 470 when a corresponding user is viewing a webpage that displays the corresponding item (e.g., the item for which the review summaries 470 pertain).

Figure 5:
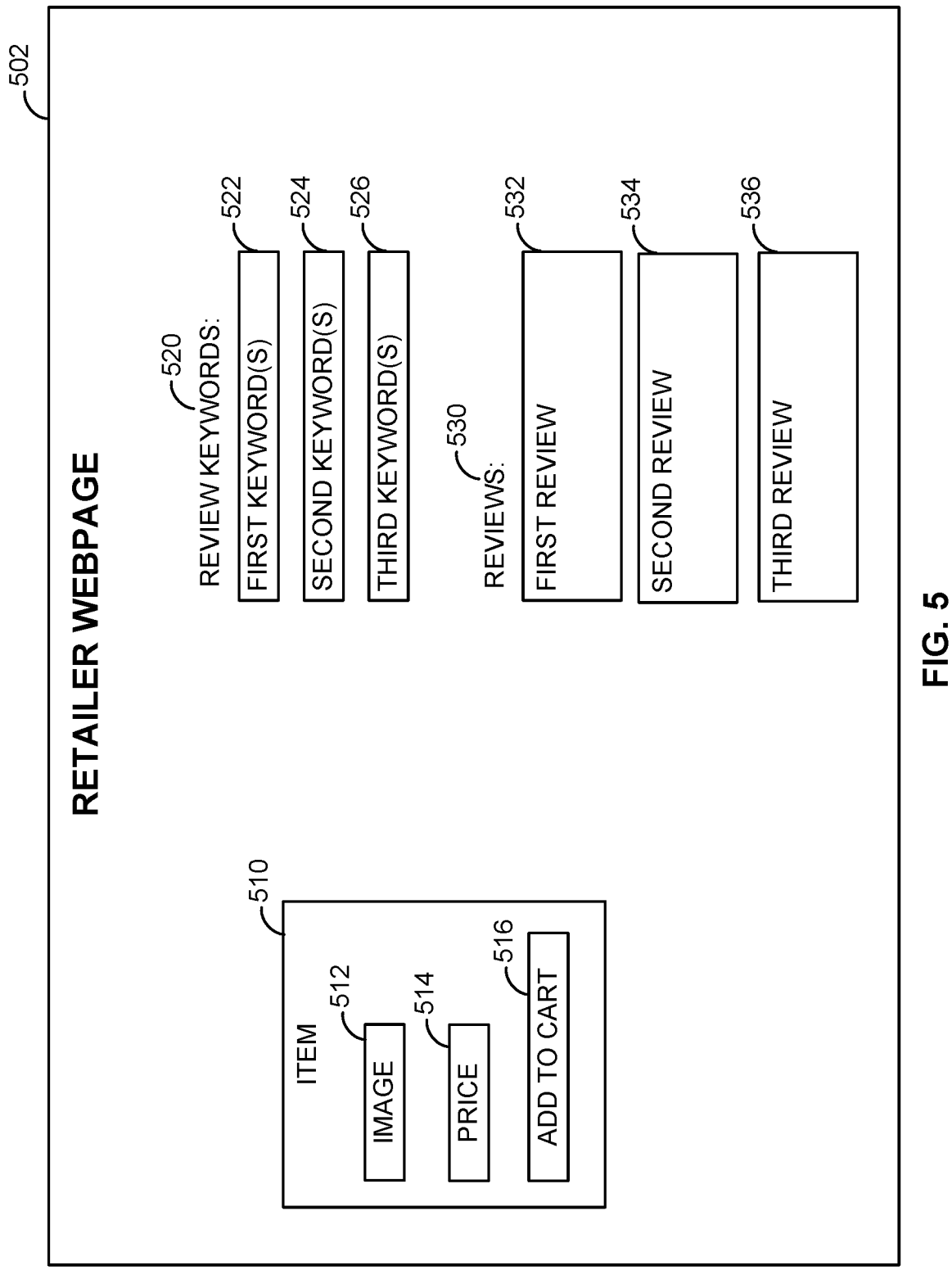
FIG. 5 is an example webpage displaying item reviews in accordance with some embodiments.

FIG. 5 illustrates an example retailer's webpage 502 hosted by, for example, web server 104. Retailer's webpage 502 displays an item 510 that includes image 512, which may be an image of the item, price 514, which may display a price for the purchase of the item, and add to cart icon 516 that allows a user to add the item to an online shopping cart associated with retailer webpage 502. Retailer webpage 502 also displays reviews 530. In this example, there are three reviews displayed including first review 532, second review 534, and third review 536. Each of first review 532, second review 534, and third review 536 may be based on an abstractive summary of reviews relevant to a particular user.

For example, review customization computing device 102 may obtain reviews from a plurality of users for item 510. Review customization computing device 102 may extract aspects (e.g., keywords) from the reviews. Review customization computing device 102 may then determine which aspects the particular user is interested in, and obtain reviews for item 510 that include those aspects. Review customization computing device 102 may then extract portions of the reviews that include the aspects, and generate an abstractive summary of those reviews. Review customization computing device 102 may transmit the abstractive summaries of the reviews to web server 104, which may display the abstractive summaries as first review 532, second review 534, and third review 536.

Retailer webpage 502 also includes review keywords 520, each of which may include one or more words. Each of first keyword 522, second keyword 524, and third keyword 526 are icons that may be engaged (e.g., clicked on) by a user. When a user engages a keyword, reviews 530 are updated to reflect reviews consistent with the engaged keyword. For example, if a user engages first keyword 522, web server 104 updates (e.g., refreshes) reviews 530 to include a first review 532, a second review 534, and a third review 536 that include or are associated with first keyword 522. Similarly, if a user engages either second keyword 524 or third keyword 526, web server 104 updates reviews 530 accordingly.

Figure 6:
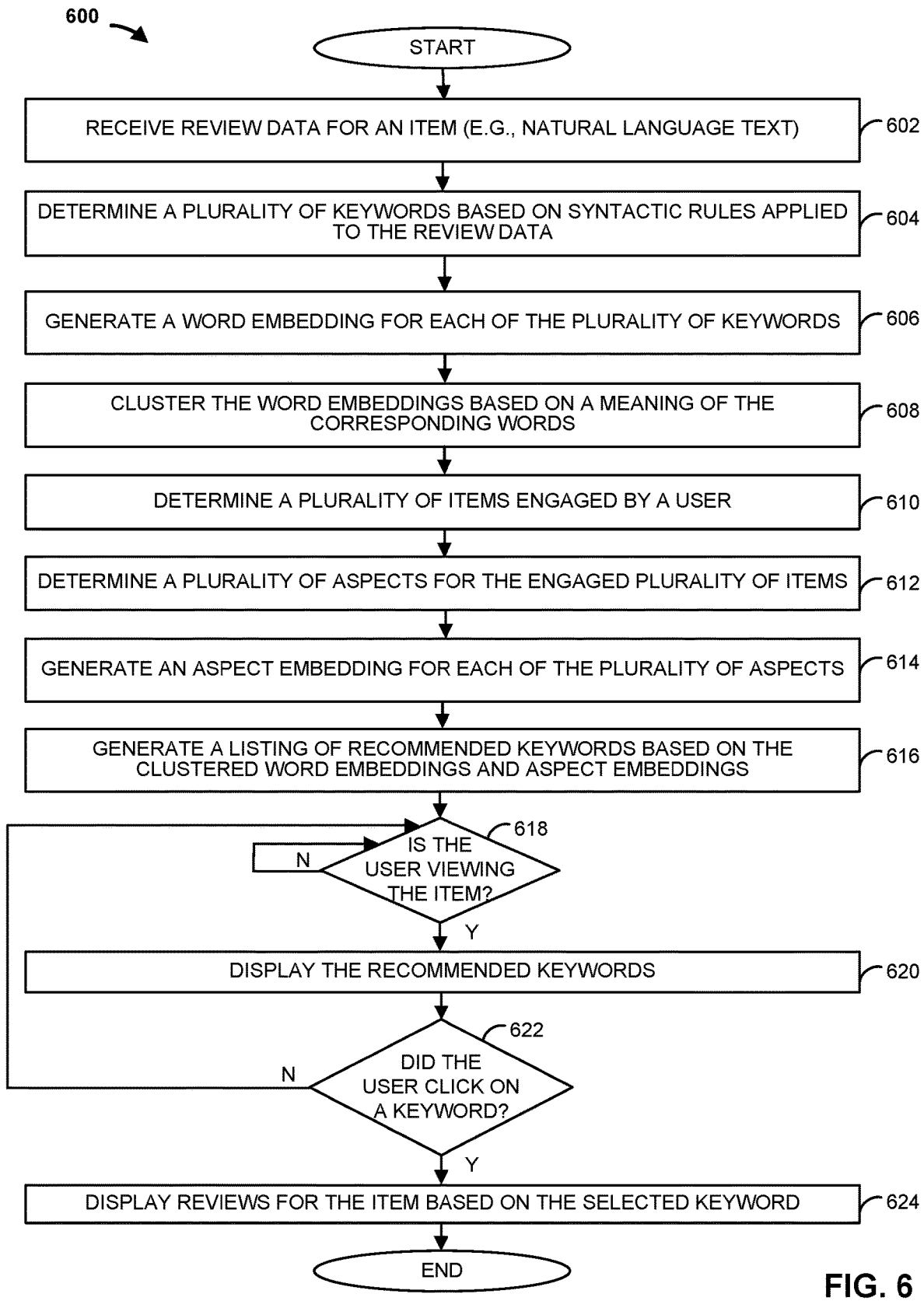
FIG. 6 is a flowchart of an example method that can be carried out by the digital review customization system of FIG. 1 in accordance with some embodiments.

FIG. 6 is a flowchart of an example method 600 that can be carried out by the digital review customization system 100 of FIG. 1. Beginning at step 602, a computing device, such as review customization computing device 102, receives review data for an item. The review data may identify and characterize natural language text, for example. At step 604, a plurality of keywords are determined based on syntactic rules that are applied to the review data. Proceeding to step 606, a word embedding for each of the plurality of keywords are generated. At step 608, the word embeddings are clustered based on the meaning of corresponding words. For example, word embeddings representing words with similar meanings are clustered together.

At step 610, a plurality of items engaged by a user is determined. For example, web server 104 may transmit a message to review customization computing device 102 identifying a plurality of items that the user has viewed or clicked on. Proceeding to step 612, a plurality of aspects for the engaged plurality of items is determined. The aspects may be based on attributes of the items, such as a product description, as well as on reviews of the items. At step 614, an aspect embedding is generated for each of the plurality of aspects. At step 616, a listing of recommended keywords is generated based on the clustered word embeddings and the aspect embeddings. For example, review customization computing device 102 may apply a weight to each of the word embeddings and aspect embeddings based on predefined weighting values, and determine a ranked list of recommended keywords based on the weights associated with the clustered word embeddings and corresponding weights associated with the aspect embeddings.

At step 618, a determination is made as to whether the user is viewing the item. For example, web server 104 may transmit a message to review customization computing device 102 indicating that the user is currently viewing the item. If the user is not currently viewing the item, the method remains at step 618. Otherwise, if the user is viewing the item, the method proceeds to step 620, where the recommended keywords are displayed. For example, the keywords may be displayed as review keywords 520 including first keyword 522, second keyword 524, and third keyword 526. The method then proceeds to step 622.

At step 622, a determination is made as to whether a user has clicked on a keyword. If the user has not clicked on a keyword, the method proceeds back to step 618, to determine if the user is still viewing the item. Otherwise, if the user did click a keyword, the method proceeds to step 624, where reviews for the item are displayed. The displayed reviews are based on the selected keyword. For example, the displayed reviews may include, or otherwise be associated with, the selected keyword. The method then ends.

Figure 7:
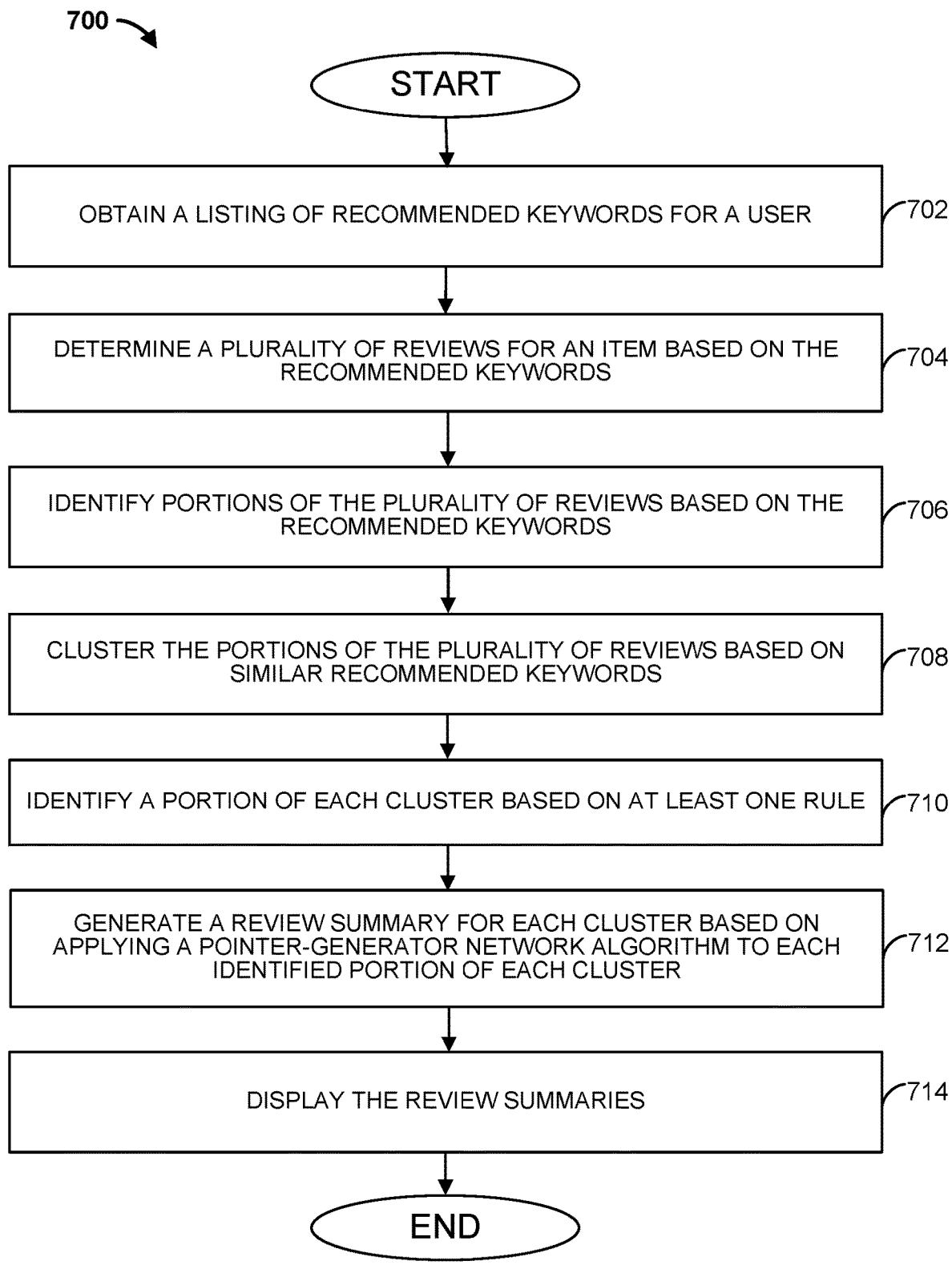
FIG. 7 is a flowchart of another example method that can be carried out by the digital review customization system of FIG. 1 in accordance with some embodiments.

FIG. 7 is a flowchart of an example method 700 that can be carried out by the digital review customization system 100 of FIG. 1. At step 702, a computing device, such as review customization computing device 102, obtains a listing of recommended keywords for a user. For example, the listing of recommended keywords may be generated as discussed above for method 600. At step 704, a plurality of reviews for an item are determined based on the recommended keywords. For example, the reviews may include, or otherwise be associated with, the recommended keywords. Proceeding to step 706, portions of the plurality of reviews are identified based on the recommended keywords. For example, review customization computing device 102 may identify sentences that include the keywords, and generate sentence embeddings for those sentences. At step 708, the identified portions of the plurality of reviews are clustered based on similar keywords. For example, the portions of the plurality of reviews may be clustered based on an average of word vectors identifying values for word embeddings corresponding to each sentence embedding.

Proceeding to step 710, a portion of each cluster is identified based on at least one rule. For example, review customization computing device 102 may identify a longest sentence of each cluster. At step 712, a review summary is generated for each cluster. Each review summary may be generated based on the application of a pointer-generator network algorithm to identified portions of each cluster. The review summaries may then be displayed at step 714. For example, web server 104 may display the review summaries under reviews 530 as first review 532, second review 534, and third review 536. In some examples, review customization computing device 102 applies a pointer-generator network to the representative sentence embeddings from each cluster to generate a summary. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a database; and
a computing device communicatively coupled to the database and configured to:
obtain, from the database, aspect data identifying a plurality of aspects for a user, wherein the aspect data characterizes one or more discrete linguistic elements of corresponding reviews for each of a plurality of items;
obtain, from the database, a plurality of reviews for at least one item;
determine portions of the plurality of reviews based on the obtained aspect data comprising determining at least one sentence of each of the plurality of reviews;
generate cluster data identifying clusters of the portions of the plurality of reviews comprising:
generating a plurality of word embeddings based on the portions of the plurality of reviews, comprising generating a word embedding for each word of the at least one sentence of each of the plurality of reviews;
combining at least a portion of the plurality of word embeddings to generate a plurality of sentence embeddings, comprising combining the word embeddings for the at least one sentence of each of the plurality of reviews to generate a corresponding sentence embedding;
determining a sentence value for each of the plurality of sentence embeddings based on their corresponding word embeddings, comprising determining an average value of the word embeddings for the at least one sentence of each of the plurality of reviews;

clustering the plurality of sentence embeddings based on the sentence values, comprising clustering the plurality of sentence embeddings based on the average values of the at least one sentence of each of the plurality of reviews; and
applying a corresponding weight to each of the clusters;
generate review summary data identifying a review summary of the at least one item based on the generated cluster data; and
store the review summary data in the database.

2. The system of claim 1, wherein the computing device is configured to generate the review summary data based on applying a pointer-generator network to the generated cluster data.

3. The system of claim 1, wherein the computing device is configured to:
receive a message from a second computing device indicating the user is browsing the at least one item; and
transmit the review summary data to the second computing device.

4. The system of claim 1, wherein the computing device is configured to determine the portions of the plurality of reviews by applying one or more natural language processing algorithms to the review data.

5. The system of claim 1, wherein the computing device is configured to determine a representative portion of each cluster, wherein the generated cluster data identifies the representative portion of each cluster.

6. The system of claim 5, wherein the computing device is configured to determine a longest sentence embedding of each cluster, wherein the representative portion of each cluster is the longest sentence embedding of each cluster.

7. The system of claim 1, wherein the computing device is configured to transmit the review summary data for display.

8. The system of claim 7 comprising a web server, wherein the computing device is configured to transmit the review summary data to the web server, and wherein the web server is configured to display the review summary data when a user is viewing a webpage that displays the at least one item.

9. A method comprising:
obtaining, from a database, aspect data identifying a plurality of aspects for a user, wherein the aspect data characterizes one or more discrete linguistic elements of corresponding reviews for each of a plurality of items;
obtaining, from the database, a plurality of reviews for at least one item;
determining portions of the plurality of reviews based on the obtained aspect data, comprising determining at least one sentence of each of the plurality of reviews;
generating cluster data identifying clusters of the portions of the plurality of reviews comprising:
generating a plurality of word embeddings based on the portions of the plurality of reviews, comprising generating a word embedding for each word of the at least one sentence of each of the plurality of reviews;
combining at least a portion of the plurality of word embeddings to generate a plurality of sentence embeddings, comprising combining the word embeddings for the at least one sentence of each of the plurality of reviews to generate a corresponding sentence embedding;
determining a sentence value for each of the plurality of sentence embeddings based on their corresponding word embeddings, comprising determining an average value of the word embeddings for the at least one sentence of each of the plurality of reviews;
clustering the plurality of sentence embeddings based on the sentence values comprising clustering the plurality of sentence embeddings based on the average values of the at least one sentence of each of the plurality of reviews; and
applying a corresponding weight to each of the clusters;
generating review summary data identifying a review summary of the at least one item based on the generated cluster data; and
storing the review summary data in the database.

10. The method of claim 9 comprising generating the review summary data based on applying a pointer-generator network to the generated cluster data.

11. The method of claim 9 comprising:
receiving a message from a second computing device indicating the user is browsing the at least one item; and
transmitting the review summary data to the second computing device.

12. The method of claim 9 comprising determining the portions of the plurality of reviews by applying one or more natural language processing algorithms to the review data.

13. The method of claim 9 further comprising determining a longest sentence embedding of each cluster, wherein the generated cluster data identifies the longest sentence embedding of each cluster.

14. The method of claim 9 comprising transmitting the review summary data for display.

15. The method of claim 14 comprising transmitting the review summary data to a web server, wherein the web server displays the review summary data when a user is viewing a webpage that displays the at least one item.

16. A non-transitory computer readable medium having instructions stored thereon, wherein the instructions, when executed by at least one processor, cause a device to perform operations comprising:
obtaining, from a database, aspect data identifying a plurality of aspects for a user, wherein the aspect data characterizes one or more discrete linguistic elements of corresponding reviews for each of a plurality of items;
obtaining, from a database, a plurality of reviews for at least one item;
determining portions of the plurality of reviews based on the obtained aspect data, comprising determining at least one sentence of each of the plurality of reviews;
generating cluster data identifying clusters of the portions of the plurality of reviews comprising:
generating a plurality of word embeddings based on the portions of the plurality of reviews, comprising generating a word embedding for each word of the at least one sentence of each of the plurality of reviews;
combining at least a portion of the plurality of word embeddings to generate a plurality of sentence embeddings, comprising combining the word embeddings for the at least one sentence of each of the plurality of reviews to generate a corresponding sentence embedding;
determining a sentence value for each of the plurality of sentence embeddings based on their corresponding word embeddings, comprising determining an average value of the word embeddings for the at least one sentence of each of the plurality of reviews;
clustering the plurality of sentence embeddings based on the sentence values, comprising clustering the plurality of sentence embeddings based on the average values of the at least one sentence of each of the plurality of reviews; and applying a corresponding weight to each of the clusters;

generating review summary data identifying a review summary of the at least one item based on the generated cluster data; and storing the review summary data in the database.

17. The non-transitory computer readable medium of claim 16 further comprising instructions stored thereon that, when executed by at least one processor, further cause the device to perform operations comprising determining the portions of the plurality of reviews by applying one or more natural language processing algorithms to the review data.

18. The non-transitory computer readable medium of claim 16 further comprising instructions stored thereon that, when executed by at least one processor, further cause the device to perform operations comprising transmitting the review summary data for display.

19. The non-transitory computer readable medium of claim 18 further comprising instructions stored thereon that, when executed by at least one processor, further cause the device to perform operations comprising transmitting the review summary data to a web server, wherein the web server displays the review summary data when a user is viewing a webpage that displays the at least one item.

\* \* \* \* \*